(12) United States Patent
Yamazaki (10) Patent No.: US 6,813,441 B2
(45) Date of Patent: Nov. 2, 2004

(54) LENS DRIVE SYSTEM

(75) Inventor: Yoshihiro Yamazaki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/325,958

(22) Filed: Dec. 23, 2002

(65) Prior Publication Data

US 2003/0118336 A1 Jun. 26, 2003

(30) Foreign Application Priority Data

Dec. 26, 2001 (JP) .......................... 2001-394386

(51) Int. Cl.$^7$ ................ G03B 17/00; G02B 15/14; G02B 7/02

(52) U.S. Cl. ................... 396/82; 396/85; 359/696; 359/829

(58) Field of Search .................. 396/79, 72, 76, 396/77, 80, 82, 83, 85, 414, 694, 696, 705, 827, 829, 821, 824, 529; 359/699, 700, 701, 703, 704, 823, 825, 826

(56) References Cited

U.S. PATENT DOCUMENTS 6,038,404 A * 3/2000 Suzuki et al. .............. 396/79
6,434,334 B2   8/2002 Ichinokawa ............... 396/144

* cited by examiner

Primary Examiner—Rodney Fuller
Assistant Examiner—Rochelle Blackman
(74) Attorney, Agent, or Firm—Greenblum & Bernstein, P.L.C.

(57) ABSTRACT

A lens drive system includes a lens frame having a lens element; a nut member secured to the lens frame, and which are both movable in an optical axis direction without rotating; a feed screw shaft having a male thread portion and a non-threaded portion, the male thread portion being engaged with a screw hole of the nut member; a motor for rotating the feed screw shaft; and a biasing member for biasing the nut member in a first direction toward the male thread portion. When the feed screw shaft is rotated to move the nut member and the lens frame in a second direction toward the non-thread portion, the female thread portion is disengaged from the male thread portion to move onto the non-threaded portion before the lens frame or the nut member abuts against an element of the lens drive system and stops thereby.

25 Claims, 5 Drawing Sheets

LENS DRIVE SYSTEM

BACKGROUND OF THE INVENTION

1. Field of the Invention

The present invention relates to a lens drive system using a feed screw for moving one or more lens groups.

2. Description of the Related Art

An optical instrument such as a camera which is provided with a lens drive system using a feed screw for moving one or more lens groups is known in the art.

Such a lens drive system is provided with a feed screw shaft on which a male thread portion is formed, a nut member which is provided with a female thread portion which is engaged with the male thread portion of the feed screw shaft, a motor for rotating the feed screw shaft, and a lens frame or a lens holder for holding one or more lens elements. Rotating the feed screw shaft by the motor causes the lens frame to move together with the nut member.

In such a conventional lens drive system, if the feed screw shaft continues to be rotated by the motor until the lens frame or the nut member abuts against another member and stops thereby, the nut member and the feed screw shaft, which are engaged with each other, tightly fasten themselves on each other. This sometimes makes any further rotation of the feed screw shaft relative to the nut member impossible.

To prevent such a problem from occurring, it is generally the case that operation of the motor is controlled so that the motor stops rotating immediately after a position sensor senses that the lens frame has reached a predetermined stop position before the lens frame or the nut member runs over the stop position and abuts against another member.

However, there is a possibility that the position sensor cannot sense for some reason that the lens frame reaches a predetermined position. In this case, the feed screw shaft continues to be rotated by the motor until the lens frame or the nut member abuts against another member and stops thereby. As a result, the nut member and the feed screw shaft tightly fasten themselves on each other. This sometimes makes any further movement of the lens frame impossible.

Since one or more lens groups have been required to be moved by motor with a high degree of precision in recent years, there has been a tendency to reduce the pitch of the feed screw of the lens drive system. This tendency makes it easy to cause the nut member and the feed screw shaft to tightly fasten or lock themselves on each other.

SUMMARY OF THE INVENTION

The present invention provides a lens drive system which can reliably prevent the aforementioned problems which reside in conventional lens drive systems wherein the nut member and the feed screw shaft sometimes tightly fasten themselves on each other.

For example, a lens drive system is provided, including a lens frame having at least one lens element; a nut member which is secured to the lens frame, the lens frame and the nut member being movable in an optical axis direction without rotating relative to a base of the lens drive system, the direction of a screw hole of the nut member being parallel with the optical axis; a feed screw shaft having a male thread portion and a non-threaded portion, the male thread portion being engaged with a screw hole of the nut member so that the male thread portion is engaged with a female thread portion formed on an inner peripheral surface of the screw hole, a diameter of the non-threaded portion being smaller than an inner diameter of the screw hole; a motor for rotating the feed screw shaft; and a biasing member for biasing the nut member in a first direction from the non-threaded portion toward the male thread portion. When the feed screw shaft is rotated in a predetermined rotational direction by the motor to move the nut member and the lens frame in a second direction from the male thread portion toward the the non-threaded portion, the female thread portion is disengaged from the male thread portion to move onto the non-threaded portion before at least one of the lens frame and the nut member abuts against an element of the lens drive system other than the lens frame and the nut member and stops thereby.

It is desirable for the female thread portion to reengage with the male thread portion from the non-threaded portion by a rotation of the feed screw shaft in a rotational direction reverse to the predetermined rotational direction when the female thread portion is positioned on the non-threaded portion.

The biasing member can be a helical compression spring which is provided coaxially to the feed screw shaft.

The lens drive system can further include a pressing member having a through hole in winch the feed screw shaft is inserted. The pressing member is biased by the biasing member to press the nut member in the first direction from the non-threaded portion to the male thread portion.

It is desirable for a surface of the pressing member which presses the nut member to extend in a direction substantially orthogonal to an axis of the feed screw shaft.

It is desirable for a portion of the feed screw shaft to be fitted into the through hole of the pressing member with a minimum clearance between the through hole and the portion of the feed screw shaft when the female thread portion is positioned on the non-threaded portion.

The lens drive system can further including a second biasing member for biasing the lens frame in the first direction from the non-threaded portion toward the male thread portion. The nut member presses the lens frame to move the lens frame toward the non-threaded portion when the lens frame is driven to move in the second direction from the male thread portion toward the non-threaded portion. The lens frame moves toward the male thread portion by a biasing force of the second biasing member when the lens frame is driven to move in the first direction from the non-threaded portion toward the male thread portion.

The biasing member can bias the nut member in a first direction from the non-threaded portion toward the male thread portion when the female thread portion of the nut member is positioned on the non-threaded portion.

The biasing member can indirectly bias the nut member in the first direction from the non-threaded portion toward the male thread portion when the female thread portion of the nut member is positioned on the non-threaded portion.

It is desirable for the helical compression spring to be fitted on the feed screw shaft.

The lens drive system can be incorporated in a camera having a stop-position controller for optically detecting an axial position of the lens frame, for driving the motor in accordance with the detected axial position of the lens frame, and for stopping the lens frame at a predetermined axial position. If the stop-position controller malfunctions, the lens drive system operates to avoid an adverse effect on the lens drive system due to the malfunction.

Furthermore, if the stop-position controller malfunctions, the lens drive system operates so that the nut member and the feed screw shaft do not tightly fasten themselves on each other when the stop-position controller malfunctions.

It is desirable for the lens element, which is held by the lens frame, to be a focusing lens group of a photographing optical system.

The lens drive system can be incorporated in a zoom lens barrel. The lens element, which is held by the lens frame, can be a rearmost lens group serving as a focusing lens group of a photographing optical system. The base can be formed as a part of a housing of the zoom lens barrel.

It is desirable for the lens frame to be guided linearly in an optical axis direction without rotating about the optical axis.

According to another embodiment, a lens drive system is provided, including a lens frame having at least one lens element; a nut member which is secured to the lens frame, the lens frame and the nut member being movable in an optical axis direction without rotating relative to a base of the lens drive system, the direction of a screw hole of the nut member being parallel with the optical axis; a feed screw shaft having a male thread portion and a non-threaded portion, the male thread portion being engaged with a screw hole of the nut member so that the male thread portion is engaged with a female thread portion formed on an inner peripheral surface of the screw hole, a diameter of the non-threaded portion being smaller than an inner diameter of the screw hole; a motor for rotating the feed screw shaft; and a biasing member for biasing the lens frame in a first direction from the non-threaded portion toward the male thread portion. When the feed screw shaft is rotated in a predetermined rotational direction by the motor to move the lens frame in a second direction from the male thread portion toward the non-threaded portion, the female thread portion is disengaged from the male thread portion to move onto the non-threaded portion before at least one of the lens frame and the nut member abuts against an element of the lens drive system other than the lens frame and the nut member and stops thereby.

It is desirable for the biasing member to bias the nut member in the first direction from the non-threaded portion toward the male thread portion. The female thread portion returns onto the male thread portion from the non-threaded portion by a rotation of the feed screw shaft in a rotational direction reverse to the predetermined rotational direction when the female thread portion is positioned on the non-threaded portion.

It is desirable for the nut member to press the lens frame to move the lens frame toward the non-threaded portion when the lens frame is driven to move in the second direction from the male thread portion toward the non-threaded portion. The lens frame moves toward the male thread portion by a biasing force of the biasing member when the lens frame is driven to move in the first direction from the non-threaded portion toward the male thread portion.

It is desirable for the lens frame includes a pressing portion having a through hole in which the feed screw shaft is inserted. At least the pressing portion of the lens frame presses the nut member in the first direction from the non-threaded portion to the male thread portion via a biasing force of the biasing member.

It is desirable for a surface of the pressing portion which presses the nut member to extend in a direction substantially orthogonal to an axis of the feed screw shaft.

The lens drive system can be incorporated in a camera having a stop-position controller for optically detecting an axial position of the lens frame, for driving the motor in accordance with the detected axial position of the lens frame, and for stopping the lens frame at a predetermined axial position. If the stop-position controller malfunctions, the lens drive system operates to avoid an adverse effect on the lens drive system due to the malfunction.

Furthermore, if the stop-position controller malfunctions, the lens drive system operates so that the nut member and the feed screw shaft do not tightly fasten themselves on each other when the stop-position controller malfunctions.

The lens element, which is held by the lens frame, can be a focusing lens group of a photographing optical system.

The lens drive system can be incorporated in a zoom lens barrel. The lens element, which is held by the lens frame, can be a rearmost lens group serving as a focusing lens group of a photographing optical system. The base can be formed as a part of a housing of the zoom lens barrel.

It is desirable for the lens frame to be guided linearly in an optical axis direction without rotating about the optical axis.

In another embodiment, a lens barrel is provided, including a photographing optical system having of a plurality of lens groups, the plurality of lens groups including a focusing lens group, the lens barrel including a linear guide mechanism for linearly guiding the focusing lens group in an optical axis direction without making the focusing lens group rotate relative to a stationary barrel of the lens barrel; a nut member having a screw hole which is guided linearly in the optical axis direction without rotating relative to the stationary barrel via the linear guiding mechanism; a feed screw shaft having a male thread portion and a non-threaded portion, the feed screw shaft being inserted in the screw hole so that the male thread portion is engaged with a female thread portion formed on an inner peripheral surface of the screw hole, a diameter of the non-threaded portion being smaller than an inner diameter of the screw hole; a motor for rotating the feed screw shaft; a lens frame which holds at least one lens element and is movable together with the nut member; and a biasing member for biasing the nut member in a first direction from the non-threaded portion toward the male thread portion. When the feed screw shaft is rotated in a predetermined rotational direction by the motor to move the nut member and the lens frame in a second direction from the male thread portion toward the non-threaded portion, the female thread portion is disengaged from the male thread portion to move onto the non-threaded portion.

It is desirable for the linear guide mechanism to include at least one guide shaft which extends parallel to the optical axis to guide the lens frame linearly in the optical axis direction, the at least one guide shaft being engaged with the nut member to guide the nut member linearly in the optical axis direction.

The present disclosure relates to subject matter contained in Japanese Patent Application No.2001-394386 (filed on Dec. 26, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

FIGS. 1 through 4 show a first embodiment of a lens drive system 1A according to the present invention.

Figure 2:
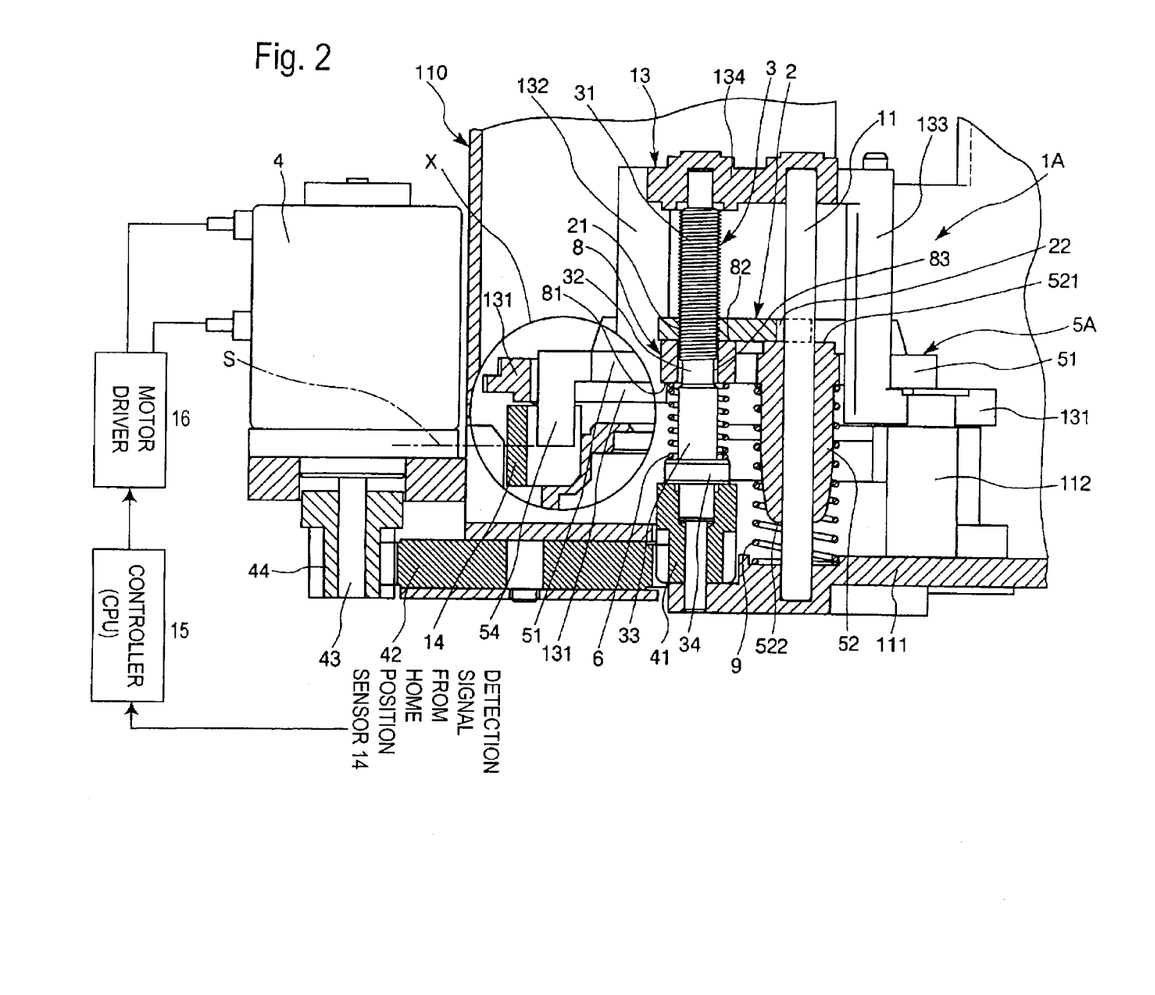
FIG. 2 is a cross sectional view of the lens drive system shown in FIG. 1, showing a state where a female thread portion of a nut member is engaged with a male thread portion of a feed screw shaft.
Figure 3:
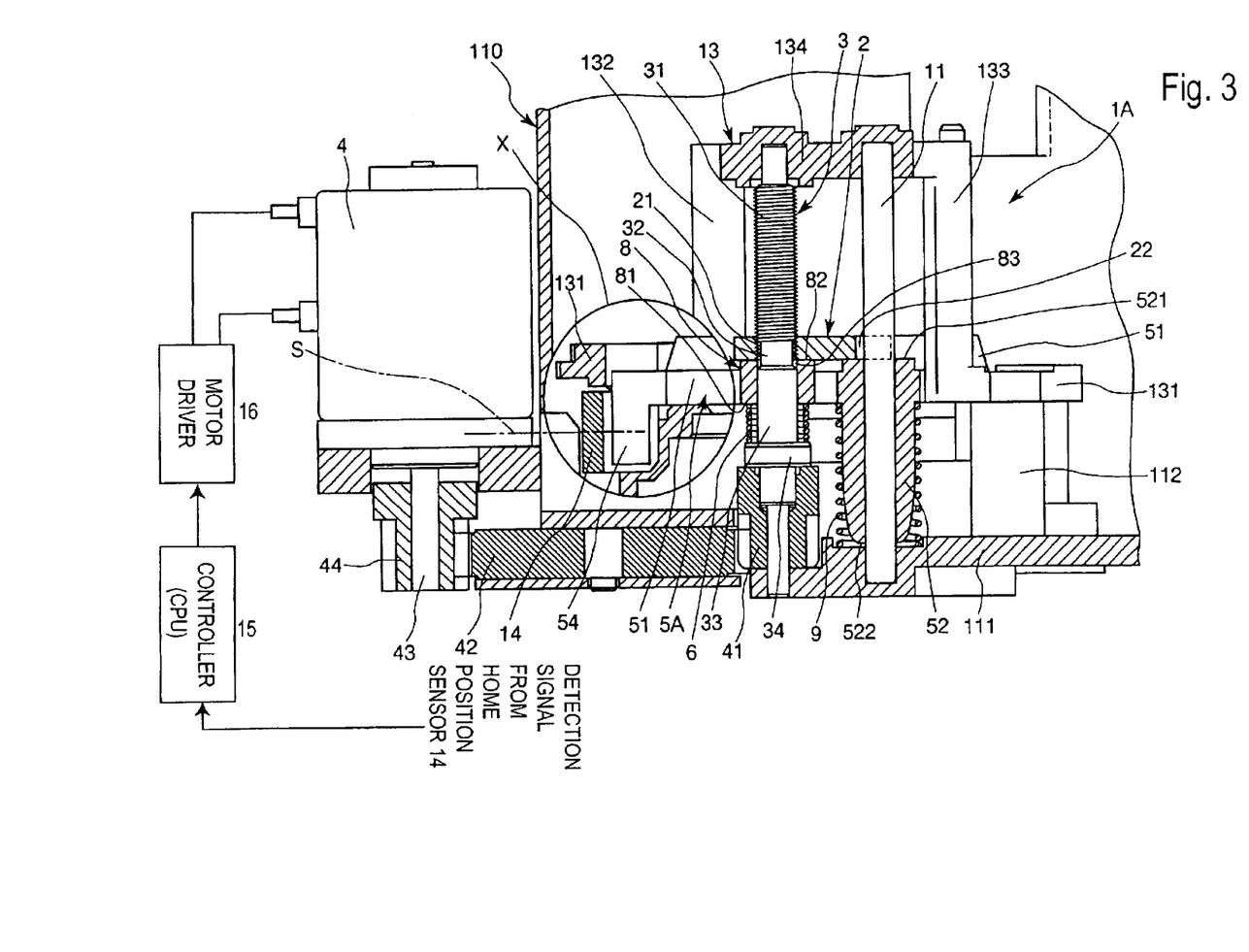
FIG. 3 is a view similar to that of FIG. 2, showing a state where the female thread portion of the nut member is positioned on a non-threaded portion of the feed screw shaft which is formed behind the male thread portion of the feed screw shaft.
Figure 4:
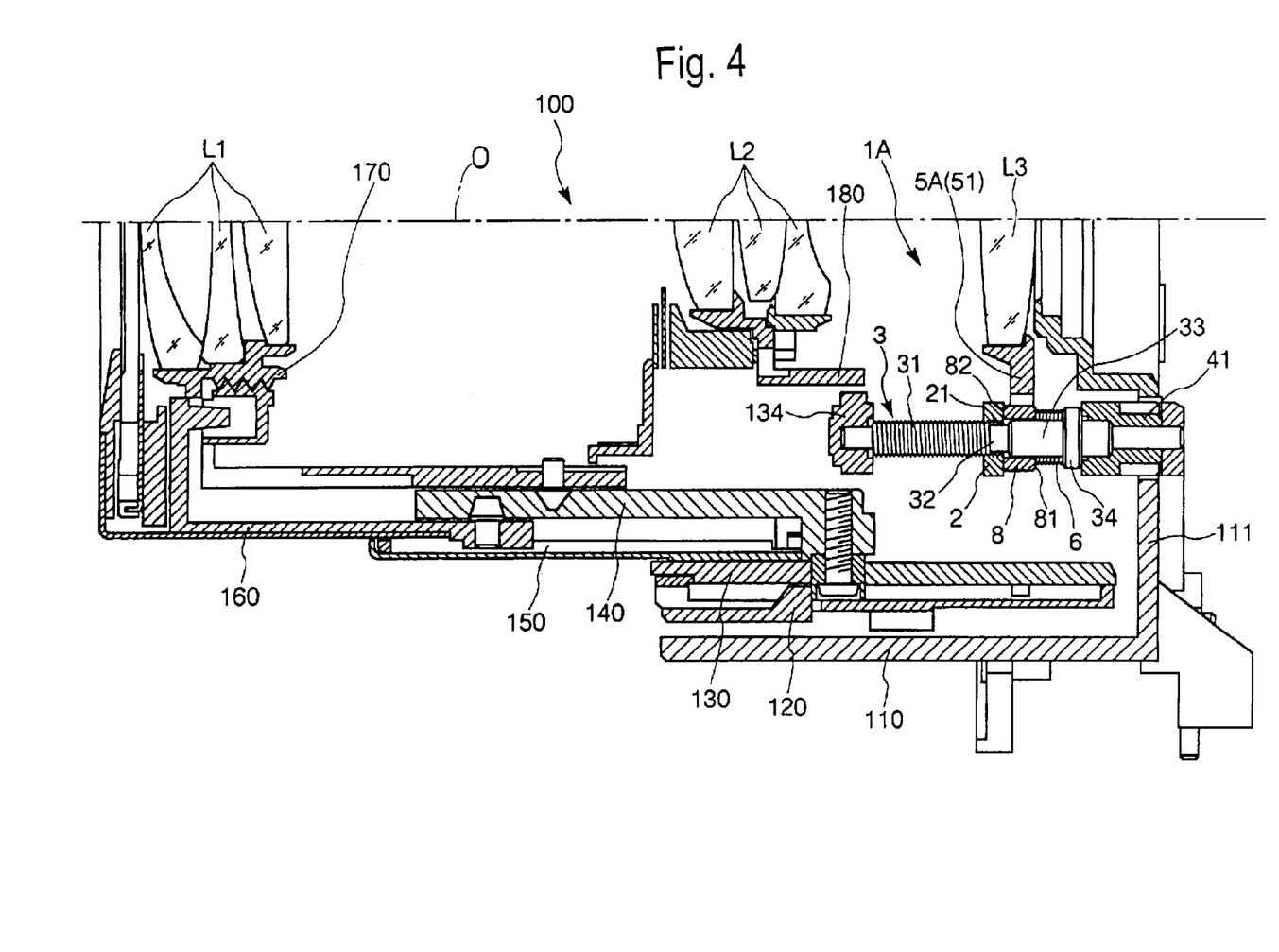
FIG. 4 is an axial cross sectional view, above an optical axis, of a lens barrel of a digital camera which incorporates the lens drive system shown in FIG. 1.
Figure 5:
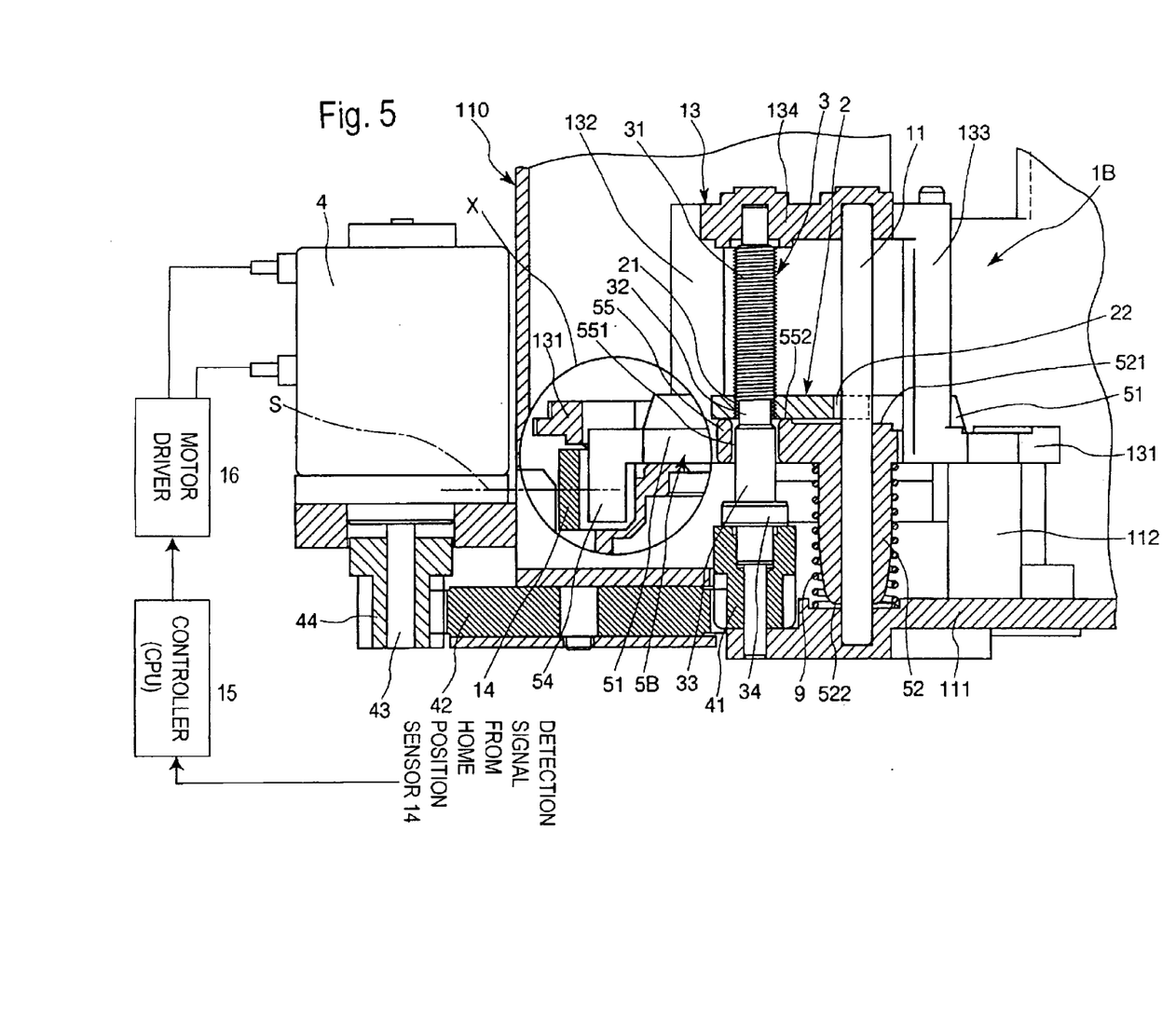
FIG. 5 is a view similar to that of FIG. 3, showing a second embodiment of the lens drive system according to the present invention.

In the following descriptions of the first embodiment of the lens drive system, the upper side of the lens drive system as viewed in FIGS. 2 and 3 is referred to as the front side or object side of the lens drive system, while the lower side of the lens drive system as viewed in FIGS. 2 and 3 and also the right side of the lens drive system as viewed in FIG. 4 are each referred to as the rear side of the lens drive system. In FIGS. 2 and 3, a cross sectional view shown in a circle X is a cross sectional view of the lens drive system which is taken along a plane different from a plane along which a cross sectional view of the remaining portion of the lens drive system which is positioned outside the circle X is taken. A cross sectional view shown in a circle X in FIG. 5 is a view similar to that in FIG. 3.

As shown in FIG. 4, the lens drive system 1A is incorporated in a lens barrel 100 of a digital camera. The lens drive system 1A moves a third lens group L3 serving as a focusing lens group in a direction of a photographing optical axis O (i.e., optical axis direction) of the lens barrel 100.

First of all, the overall structure of the lens barrel 100 will be hereinafter discussed briefly. As shown in FIG. 4, the lens barrel 100 is provided with a photographing optical system constructed of three lens groups: a first lens group L1, a second lens group L2, and the aforementioned third lens group L3, in that order from the front side of the lens barrel 100, i.e., from the object side.

The lens barrel 100 is provided with a housing 110, a rotating ring 120, a stationary ring 130, a cam ring 140, an outer ring 150, an inner ring 160, a first lens frame 170 and a second lens frame 180. The housing 110 is fixed to a camera body (not shown). The rotating ring 120 is positioned inside the housing 110. The stationary ring 130 is positioned inside the rotating ring 120. The cam ring 140 is positioned inside the stationary ring 130. The outer ring 150 is positioned between the stationary ring 130 and the cam ring 140. The first lens frame 170 and the second lens frame 180 are positioned inside the cam ring 140.

The first lens group L1 is fixed to the first lens frame 170 while the second lens group L2 is fixed to the second lens frame 180.

The housing 110 and the stationary ring 130 are fixed to the camera body. Accordingly, each of the housing 110 and the stationary ring 130 does not move linearly in the optical axis direction or rotate about the optical axis O relative to the camera body.

The rotating ring 120 is driven to rotate about the optical axis O by a motor (not shown). The lens barrel 100 is provided with a plurality of mechanisms (the descriptions of which are omitted). One of the plurality of mechanisms includes a cam mechanism using a cam ring. If the rotating ring 120 rotates via the plurality of mechanisms, the cam ring 140 moves in the optical axis direction while rotating about the optical axis O. At the same time, the outer ring 150, the inner ring 160, the first lens frame 170 and the second lens frame 180 move in the optical axis direction.

Accordingly, the lens barrel 100 can change between an accommodation state (not shown) where the outer ring 150, the inner ring 160, the first lens frame 170 and the second lens frame 180 retreat into the housing 110, and a ready-to-photograph state shown in FIG. 4 where each of the outer ring 150, the inner ring 160, the first lens frame 170 and the second lens frame 180 advances from the housing 110. A zooming operation is carried out by moving the first and second lens groups L1 and L2 in the optical axis direction while varying the space therebetween.

A focusing operation is carried out by moving the third lens group L3 in the optical axis direction by the lens drive system 1A. The lens drive system 1A will be hereinafter discussed in detail.

Figure 1:
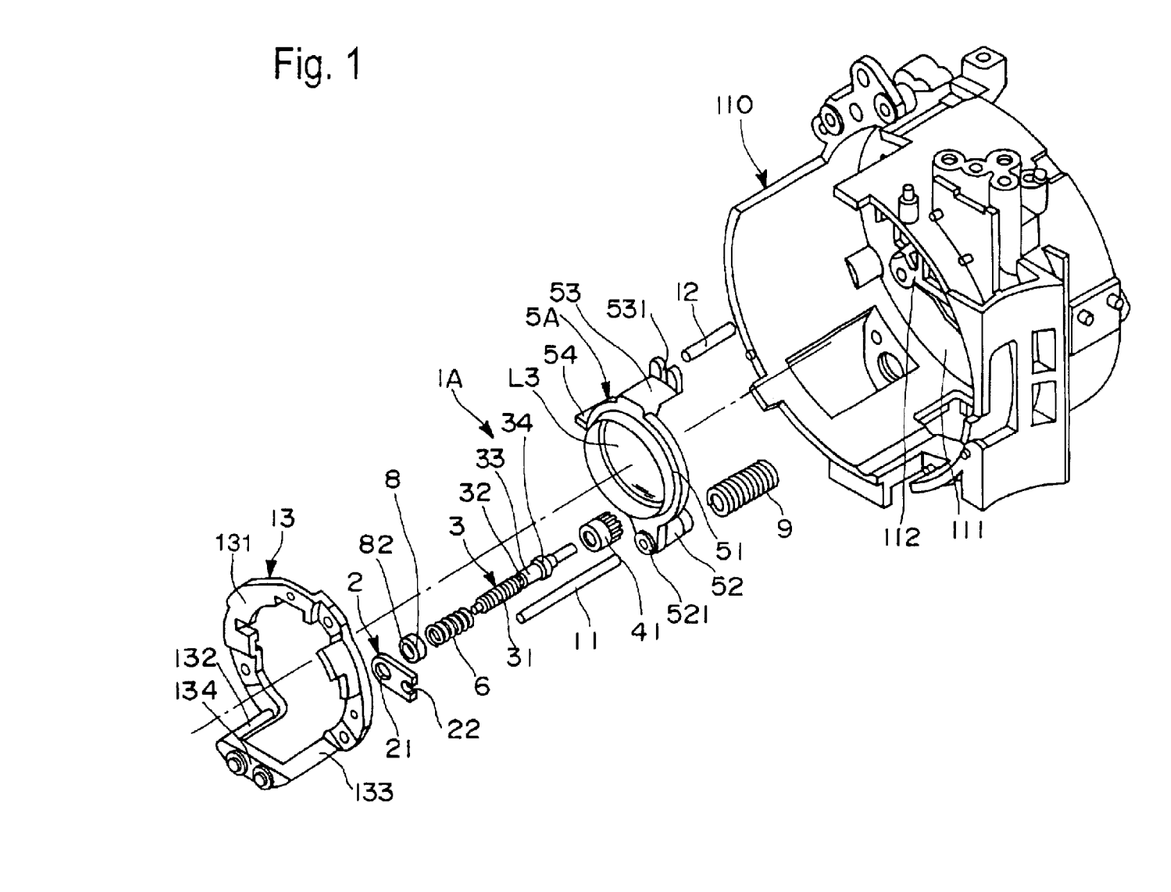
FIG. 1 is an exploded perspective view of a first embodiment of a lens drive system according to the present invention.

As shown in FIGS. 1 and 2, the lens drive system 1A is provided with a nut member 2, a feed screw shaft 3, a motor 4, a third lens frame 5A, a first helical compression spring 6, a spacer 8 and a second helical compression spring 9. The nut member 2 is provided with a screw hole having a female thread portion 21 which is formed on the inner peripheral surface of the screw hole. A male thread portion 31 of the feed screw shaft 3 is inserted into the screw hole of the nut member 2 and engages with the female thread portion 21. The motor 4 rotates the feed screw shaft 3. The third lens frame 5A holds the third lens group L3, and moves together with the nut member 2 in the optical axis direction. The first helical compression spring 6 is fitted on the feed screw shaft 3 from the front end thereof to bias the nut member 2 forward (toward the front side of the lens barrel 100) in the optical axis direction. The spacer 8 is loosely fitted on the feed screw shaft 3 to be positioned between the nut member 2 and the first helical compression spring 6 to press the nut member 2 forward via the first helical compression spring 6. The second helical compression spring 9 serves as a biasing member which biases the third lens frame 5A forward in the optical axis direction.

The third lens frame 5A is positioned in the housing 110 to be supported thereby to be movable along the optical axis O with respect to the housing 110. The third lens frame 5A is guided in the optical axis direction by first and second guide shafts 11 and 12 which extend parallel to the optical axis O.

As shown in FIG. 1, the third lens frame 5A is composed of a lens frame portion 51, a cylindrical portion 52, a projecting portion 53 and a blade portion 54. The lens frame portion 51 has a substantially circular ring shape, and is fixed to the rim of the third lens group L3. The cylindrical portion 52 has a guide hole in which the first guide shaft 11 is inserted. The projecting portion 53 extends rearward from the lens frame portion 51, and is provided at the rear end thereof with a bifurcated portion having a groove 531 in which the second guide shaft 12 is engaged. The blade portion 54 is formed to be able to enter into a home position sensor 14.

As shown in FIG. 2, a motor driver 16 and a stop-position controller (CPU) 15 is provided. The stop-position controller 15 determines the position of the third lens group L3 based on detection signals received from the home position sensor 14, and controls the driving of the motor 4 via a motor driver 16.

The cylindrical portion 52, the projecting portion 53 and the blade portion 54 extend rearward from an outer peripheral portion of the lens frame portion 51. The cylindrical portion 52 and the projecting portion 53 are formed on the lens frame portion 51 on substantially opposite sides of the optical axis O.

The rear ends of the first and second guide shafts 11 and 12 are fixed to a rear end wall 111 of the housing 110 to be supported thereby, while the front ends of the first and second guide shafts 11 and 12 are fixed to a shaft supporting member 13 to be supported thereby. The first and second guide shafts 11 and 12, the cylindrical portion 52, and the groove 531 constitute a linear guide mechanism.

The shaft supporting member 13 is provided with a substantially C-shaped frame portion 131, two supporting arms 132 and 133, and a connecting portion 134. The frame portion 131 is positioned around the lens frame portion 51 of the third lens frame 5A. The two supporting arms 132 and 133 extend forward in parallel to each other from the opposite ends of the C-shaped frame portion 131, respectively. The connecting portion 134 extends in a direction substantially orthogonal to the two supporting arms 132 and 133 to connect the front ends of the two supporting arms 132 and 133.

As shown in FIG. 2, the frame portion 131 of the shaft supporting member 13 is fixed to a fixing portion 112 by a known fixing device such as set screws (not shown). The fixing portion 112 extends forward from the rear end wall 111 of the housing 110.

The front end of the first guide shaft 11 is supported by the connecting portion 134, while the front end of the second guide shaft 12 is supported by the frame portion 131 at a central portion thereof.

The feed screw shaft 3 is disposed in the vicinity of the first guide shaft 11 to be parallel to the first guide shaft 11. The front end of the feed screw shaft 3 is supported by the connecting portion 134 to be freely rotatable, while the rear end of the feed screw shaft 3 is supported by the rear end wall 111 of the housing 110 to be freely rotatable. Accordingly, the feed screw shaft 3 is rotatable relative to the housing 110.

The feed screw shaft 3 is provided with the male thread portion 31 and a non-threaded portion 32 which is positioned behind the male thread portion 31.

The male thread portion 31 is formed on the feed screw shaft 3 in a range from a portion of the feed screw shaft 3 in the vicinity of the front end thereof to an approximate center thereof. The male thread portion 31 is normally engaged with the female thread portion 21 of the nut member 2.

The diameter of the non-threaded portion 32 is smaller than the inner diameter of the screw hole of the nut member 2 (i.e., the inner diameter of the female thread portion 21), so that the non-threaded portion 32 can be inserted into the screw hole of the nut member 2 as shown in FIG. 3. The axial length of the non-threaded portion 32 is greater than the axial length of the female thread portion 21 of the nut member 2 so that the female thread portion 21 can fully be positioned on the non-threaded portion 32.

It is desirable that the outer diameter of the non-threaded portion 32 be substantially identical to or slightly smaller than the inner diameter of the screw hole of the nut member 2 so that the female thread portion 21 of the nut member 2 can smoothly move back onto the male thread portion 31 from the non-threaded portion 32.

The feed screw shaft 3 is provided immediately behind the rear end of the non-threaded portion 32 with a large diameter portion 33, and is further provided immediately behind the large diameter portion 33 with an annular flange portion 34, which extends radially outwards from the feed screw shaft 3.

As shown in FIG. 1, the nut member 2 is provided with a guide groove (guide recess) 22. The first guide shaft 11 is engaged in the guide groove 22 so that the nut member 2 is prevented from rotating about the axis of the feed screw shaft 3 with respect to the housing 110. Accordingly, in a state where the female thread portion 21 of the nut member 2 is engaged with the male thread portion 31 of the feed screw shaft 3, a rotation of the feed screw shaft 3 causes the nut member 2 to move along the feed screw shaft thereon.

As shown in FIG. 2, a portion of the nut member 2 on which the guide groove 22 is formed is positioned in front of the cylindrical portion 52 of the third lens frame 5A. The nut member 2 is made out of a flat plate in the particular embodiment shown in FIG. 1.

The lens drive system 1A is provided with a pinion gear 41. The pinion gear 41 is tightly fitted on the feed screw shaft 3 on a portion thereof behind the flange portion 34 to be fixed to the feed screw shaft 3. The pinion gear 41 is engaged with an intermediate gear 42 which is engaged with a pinion gear (drive gear) 44 fitted fixedly on a rotating shaft 43 of the motor 4. The motor 4 is positioned outside the housing 110 by an outer peripheral surface thereof as shown in FIG. 2. With this arrangement, the feed screw shaft 3 is driven by the motor 4 to rotate in the same rotational direction as the rotating shaft 43 of the motor 4.

The motor 4 is, e.g., a step motor which is driven with a pulse signal from the motor driver 16 so that a desired angle of rotation (the number of rotations) can be obtained according to the input number of pulses.

The second helical compression spring 9 biases the third lens frame 5A in a direction from the non-threaded portion 32 toward the male thread portion 31, i.e., toward the front of the lens barrel 100.

The second helical compression spring 9 is loosely fitted on the cylindrical portion 52 of the third lens frame 5A. In other wards, the cylindrical portion 52 is inserted into the second helical compression spring 9. The front end of the second helical compression spring 9 is in contact with a portion of the lens frame portion 51 in the vicinity of the front end of the cylindrical portion 52, while the rear end of the second helical compression spring 9 is in contact with the rear end wall 111 of the housing 110.

The second helical compression spring 9 is fitted on the cylindrical portion 52 in a compressed state to always bias the third lens frame 5A toward the front of the lens barrel 100. This causes a front end surface 521 of the cylindrical portion 52 to press against a rear end surface of the nut member 22 in the vicinity of the guide groove 22.

Due to this structure, if the nut member 2 moves in a direction from the male thread portion 31 toward the non-threaded portion 32, i.e. toward the rear of the lens barrel 100, by a rotation of the feed screw shaft 3 in a predetermined rotational direction, the nut member 2 presses the front end surface 521 of the cylindrical portion 52 so that the third lens frame 5A moves toward the rear of the lens barrel 100 together with the nut member 2. On the other hand, if the nut member 2 moves toward the front of the lens barrel 100 by a rotation of the feed screw shaft 3 in the opposite rotational direction, the third lens frame 5A moves toward the front of the lens barrel 100 together with the nut member 2 by a spring force of the second helical compression spring 9.

Accordingly, the lens drive system 1A can move the third lens group L3 that serves as a focusing lens group, to an in-focus position on the optical axis 0 which corresponds to an object distance.

The first helical compression spring 6 biases the nut member 2 toward the front of the lens barrel 100 when the female thread portion 21 of the nut member 2 is positioned on the non-threaded portion 32 of the feed screw shaft 3. The first helical compression spring 6 aids the female thread portion 21 of the nut member 2 to move back onto the male thread portion 31 from the non-threaded portion 32 when the female thread portion 21 moves back onto the male thread portion 31 from the non-threaded portion 32.

In the present embodiment of the lens drive system, the first helical compression-spring 6 is positioned to be substantially coaxial to the feed screw shaft 3. Namely, the feed screw shaft 3 is inserted into the first helical compression spring 6.

The spacer 8 is positioned between the nut member 2 and the first helical compression spring 6. The spacer 8 is in the shape of a cylinder having a through hole 83 at the center thereof. The feed screw shaft 3 is inserted into the through hole 83 of the spacer 8. The diameter of the through hole 83 of the spacer 8 is substantially identical to or slightly larger than the outer diameter of the male thread portion 31.

The front end of the first helical compression spring 6 is in contact with the rear end surface 81 of the spacer 8, while the rear end of the first helical compression spring 6 is in contact with a front end surface of the flange portion 34 of the feed screw shaft 3. The front end surface of the spacer 8 is formed to serve as a pressing surface 82 which extends in a direction substantially orthogonal to the axis of the feed screw shaft 3. Accordingly, the spacer 8 serves as a pressing member.

In a state shown in FIG. 3 where the female thread portion 21 is positioned on the non-threaded portion 32, the first helical compression spring 6 is in a compressed state. In this state the first helical compression spring 6 presses the pressing surface 82 of the spacer 8 against the nut member 2 to bias the nut member 2 toward the front of the lens barrel 100.

As can be understood from the above description, in the present embodiment of the lens drive system, the nut member 2 can be pressed in a direction parallel to the feed screw shaft 3 by the first helical compression spring 6 indirectly via the spacer 8. This prevents the nut member 2 from tilting, which makes it possible to move the female thread portion 21 of the nut member 2 back onto the male thread portion 31 from the non-threaded portion 32 securely and smoothly.

In a state shown in FIG. 3 where the female thread portion 21 is positioned on the non-threaded portion 32, the large diameter portion 33 is inserted into the through hole 83 of the spacer 8. The diameter of the large diameter portion 33 is substantially identical or slightly smaller than the diameter of the through hole 83 of the spacer 8 so that the large diameter portion 33 can be fitted into the through hole 83 with a minimum clearance between the through hole 83 and the large diameter portion 33. This prevents the spacer 8 from tilting when the female thread portion 21 of the nut member 2 moves back onto the male thread portion 31 from the non-threaded portion 32. Consequently, the nut member 2 can be more reliably prevented from tilting.

The digital camera which incorporates the lens drive system 1A having the above described structure is provided with the stop-position controller 15 including a microcomputer. The stop-position controller 15 optically detects an axial position of the third lens frame 5A, drives the motor 4 via the motor driver 16 in accordance with the detected position of the third lens frame 5A, and stops the third lens frame 5A at a predetermined position (stop position).

The stop-position controller 15 is provided with the home position sensor 14. The home position sensor 14 is disposed in the vicinity of the third lens frame 5A to optically sense whether the third lens frame 5A (specifically, the rear end of the blade portion 54 of the third lens frame 5A) is positioned at a home position (initial position) S (see FIGS. 2 and 3).

FIG. 2 shows a state where the third lens frame 5A is in the home position S, at which the female thread portion 21 of the nut member 2 is positioned on the male thread portion 31 of the feed screw shaft 3.

In the case where an object which is to be photographed is at infinity, the object at infinity is in focus if the third lens frame 5A is located at a predetermined position in the vicinity of the home position S on the front side thereof. As an object to be photographed is closer to the lens barrel 100, the third lens frame 5A needs to be located at a position closer to the front of the lens barrel 100 to bring the object into focus.

The home position sensor 14 is provided with a light emitting element and a light receiving element which receives light emitted by the light emitting element. The blade portion 54 of the third lens frame 5A can be inserted in between the light emitting element and the light receiving element to interrupt light emitted by the light emitting element to the light receiving element.

In the home position sensor 14, the light receiving element receives light emitted by the light emitting element when the third lens frame 5A is positioned in front of the home position S, i.e., when the blade portion 54 is positioned at a position not interrupting light emitted by the light emitting element to the light receiving element. In this state, if the third lens frame 5A moves rearward to pass the home position S, the blade portion 54 interrupts light emitted by the light emitting element to the light receiving element. Accordingly, when the light receiving element of the home position sensor 14 senses no light emitted by the light emitting element, the home position sensor 14 detects (determines) that the third lens frame 5A has passed the home position S. In this state, if the third lens frame 5A is moved forward toward the front of the lens barrel 100 by a slight amount, an axial position of the third lens frame 5A, at which the light receiving element can receive light emitted by the light emitting element, is detected. This position corresponds to the home position S, which may be slightly adjusted according to an individual difference.

The stop-position controller 15 can stop the third lens frame 5A at the home position S according to the above described operation. The home position sensor 14 can be replaced by an electrical home position sensor which electrically senses a position of the third lens frame 5A.

Operations of the lens drive system 1A will be hereinafter discussed in detail.

[1] The digital camera which incorporates the lens drive system 1A (hereinafter referred to as simply "digital camera") obtains information on an object distance from a distance measuring device (not shown) provided in the digital camera when a picture is taken. The motor 4 is driven in accordance with the information on an object distance to rotate the feed screw shaft 3. This rotation of the feed screw shaft 3 moves the third lens frame 5A forward from the home position S shown in FIG. 2 to an in-focus position corresponding to the object distance.

[2] If the power of the digital camera is turned OFF after a picture is taken, the motor 4 is driven to rotate the feed screw shaft 3 in a predetermined rotational direction to move the third lens frame 5A rearward (i.e., retracting direction). Thereafter, it is normally the case that the third lens frame 5A stops at the home position S upon returning thereto, and subsequently the lens barrel 100 is fully retracted to reach an accommodation state.

However, when the lens barrel 100 is fully retracted after the power of the lens barrel 100 is turned OFF, there is a possibility of the stop-position controller 15 malfunctioning for some reason such as abuse of control software of the digital camera. If such a malfunction occurs, the home position sensor may not detect that the third lens frame 5A has passed the home position S. In this case, the motor 4 does not stop, and therefore the feed screw shaft 3 continues to rotate in the retracting direction to move the third lens frame 5A rearward. Consequently, the third lens frame 5A is moved rearward beyond the home position S.

[3] If the feed screw shaft continues to rotate in the retracting direction to move the third lens frame 5A rearward after the third lens frame 5A passes the home position S, the nut member 2 and the third lens frame 5A move further rearward, which causes the female thread portion 21 of the nut member 2 to be disengaged from the male thread portion 31 of the feed screw shaft 3 to move onto the non-threaded portion 32 of the feed screw shaft 3. At this time, a rear end surface 522 of the cylindrical portion 52 is not in contact with the rear end wall 111 of the housing 110. Namely, the female thread portion 21 of the nut member 2 moves from the male thread portion 31 to the non-threaded portion 32 before either the third lens frame 5A or the nut member 2 abuts against another element of the lens barrel 100 and stops thereby.

If the female thread portion 21 moves onto the non-threaded portion 32, the female thread portion 21 is disengaged from the male thread portion 31, so that the nut member 2 does not further move rearward even if the feed screw shaft 3 continues to rotate.

[4] In a state where the female thread portion 21 is positioned on the non-threaded portion 32, the front end of the female thread portion 21 is pressed against the rear end of the male thread portion 31 by the spring force of the first helical compression spring 6. Accordingly, driving the feed screw shaft 3 in a rotational direction reverse to the aforementioned retracting direction by the motor 4 (i.e., advancing direction) causes the female thread portion 21 and the male thread portion 31 to be engaged with each other again. Consequently, the female thread portion 21 returns onto the male thread portion 31 to be engaged therewith.

As can be understood from the above description, even if the female thread portion 21 moves onto the non-threaded portion 32, the female thread portion 21 of the nut member 2 is reliably and smoothly moved back onto the male thread portion 31 to be engaged therewith by a reverse rotation of the feed screw shaft with the aid of the spring force of the first helical compression spring 6.

[5] After the female thread portion 21 of the nut member 2 returns onto the female thread portion 31, the feed screw shaft 3 is made to keep rotating in the advancing direction. Subsequently, the motor 4 is stopped immediately after the light receiving element of the home position sensor 14 senses light emitted by the light emitting element of the home position sensor 14 to thereby stop the third lens frame 5A at the home position S.

As can be understood from the above description, the female thread portion 21 of the nut member 2 and the male thread portion 31 of the feed screw shaft 3 do not tightly fasten or lock themselves on each other even if the motor 4 accidentally continues to rotate after the third lens frame 5A retreats beyond the home position S. Accordingly, such a problem which makes it impossible to rotate the feed screw shaft 3 can reliably be prevented from occurring.

Accordingly, even if the stop-position controller 15 should malfunction, an adverse effect on the lens drive system 1A due to the malfunction can be avoided.

Contrary to the present embodiment of the lens drive system 1A, in a conventional lens drive system, if the feed screw shaft continues to be rotated by motor until a lens frame which corresponds to the third lens frame 5A or a nut member which corresponds to the nut member 2 abuts against another member and stops thereby, the nut member may tilt by the impact and/or the nut member and the feed screw shaft which are engaged with each other may tightly fasten themselves on each other by the impact. This may make any further rotation of the feed screw shaft relative to the nut member impossible. Specifically, in the case where the pitch of the male and female thread portions (which respectively correspond to the male and female thread portions 21 and 31) is set small to move a lens group (which corresponds to the third lens group L3) with a high degree of precision, the nut member and the feed screw shaft can easily tightly fasten or lock themselves on each other if the lens frame or the nut member abuts against another member.

In the present embodiment of the lens drive system, according to the above described operations of the lens drive system, the problem causing the nut member and the feed screw shaft to tightly fasten themselves on each other can be reliably prevented from occurring. Consequently, the present embodiment of the lens drive system is particularly effective when a lens group needs to be driven with a high degree of precision.

According to the present embodiment of the lens drive system, the axial length of the lens barrel 100 in an accommodation state is successfully shortened due to the structure making the third lens frame 5A pressed against the nut member 2 by the second helical compression spring 9. Namely, if the third lens frame 5A is pressed rearward against the spring force of the second helical compression spring 9 when the lens barrel 100 retreats while the third lens frame 5A retreats to the home position S to enter the accommodation state, the first lens frame 170 and the second lens frame 180 can further retreat rearward, toward the rear end of the lens barrel 100, since the third lens frame 5A can retreat until the rear end surface 522 of the cylindrical portion 52 comes into contact with the rear end wall 111 of the housing 110.

However, if miniaturization of the lens barrel 100 in the accommodation state does not have to be taken into account, it is not necessary to provide the lens drive system 1A with the second helical compression spring 9, i.e., the lens drive system 1A can be modified so that the nut member 2 and the third lens frame 5A do not move away from each other, so that the nut member 2 is attached to the third lens frame 5A, or so that the nut member 2 is formed integral with the third lens frame 5A.

The spacer 8 can be omitted i.e., the lens drive system 1A can be modified so that the first helical compression spring 6 directly presses the nut member 2.

The first helical compression spring 6 can be any other biasing member as long as it biases the nut member 2 when the female thread portion 21 is positioned on the non-threaded portion 33. Alternatively, the first helical compression spring 6 can be a type of spring which fully expands not to bias the nut member 2 when the female thread portion 21 is positioned on the male thread portion 31.

Each of the first helical compression spring 6 and the second helical compression spring 9, which serves as a biasing member, can be any other biasing member as long as it can provide a biasing force or a spring force. For instance, each of the first helical compression spring 6 and the second helical compression spring 9 can be replaced by another type of spring such as a torsion spring or a leaf spring, or a resilient member such as a rubber member.

A washer or a similar member can be disposed between the nut member 2 and the spacer 8, and/or between the nut member 2 and the cylindrical portion 52 of the third lens frame 5A. Although holding only one lens element (the third lens group L3) in the illustrated embodiment, the third lens frame 5A can be a lens frame which holds more than one lens element.

The stop-position controller 15 having the above described structure, which optically detects an axial position of the third lens frame 5A, can be omitted in the illustrated embodiment of the lens drive system. However, with the stop-position controller 15, the reliability of the lens drive system 1A is improved.

FIG. 5 shows the second embodiment of the lens drive system according to the present invention. The following descriptions will be directed mainly to points of differences between the first and second embodiments of the lens drive systems, and descriptions of parts or elements of the second embodiment of the lens drive system which are similar to those of the first embodiment of the lens drive system are omitted.

The second embodiment of the lens drive system 1B is substantially the same as the first embodiment of the lens drive system 1A except that a third lens frame 5B which is different from the first embodiment of the third lens frame 5A of the lens drive system 1A in structure is used in the second embodiment of the lens drive system 1B and that the first helical compression spring 6 and the spacer 8, which are used in the first embodiment of the lens drive system 1A, are not used in the second embodiment of the lens drive system 1B.

The third lens frame 5B of the second embodiment of the lens drive system 1B is formed as an integral combination of the third lens frame 5A and the spacer 8 in the first embodiment of the lens drive system 1A. Namely, the third lens frame 5B is provided with a presser portion 55 which corresponds to the spacer 8. The third lens frame 5B is provided with a through hole 551 into which the feed screw shaft 3 is loosely fitted.

In the second embodiment of the lens drive system, the second helical compression spring 9 has not only the same function as the function of the second helical compression spring 9 in the first embodiment of the lens drive system, but also another function to aid the female thread portion 21 of the nut member 2 to move back onto the male thread portion 31 from the non-threaded portion 32 when the female thread portion 21 moves back onto the male thread portion 31 from the non-threaded portion 32.

As shown in FIG. 5, when the female thread portion 21 of the nut member 2 is positioned on the male thread portion 31 of the feed screw shaft 3, the second helical compression spring 9 presses the nut member 2 forward, toward the front of the lens barrel 100, via the third lens frame 5B. Namely, a pressing surface 552 which is formed at the front end of the presser portion 55 of the third lens frame 5B presses the rear end surface of the nut member 2 forward.

The pressing surface 552 extends in a direction substantially orthogonal to the axis of the feed screw shaft 3. The pressing surface 552 is formed slightly closer to the front of the lens barrel 100 than the front end surface 521 of the cylindrical portion 52 to form a gap between the rear end surface of the nut member 2 and the front end surface 521 of the cylindrical portion 52.

Due to this structure, in a state where the female thread portion 21 is positioned on the non-threaded portion 32, the front end of the female thread portion 21 is pressed against the rear end of the male thread portion 31 in a manner similar to that in the first embodiment of the lens drive system. Accordingly, rotating the feed screw shaft 3 in the advancing direction by the motor 4 causes the female thread portion 21 and the male thread portion 31 to be engaged with each other again. Consequently, the female thread portion 21 returns onto the male thread portion 31 of the feed screw shaft 3 securely and smoothly.

In the second embodiment of the lens drive system, the nut member 2 is prevented from tilting by the orientation of the pressing surface 552 that extends in a direction substantially orthogonal to the axis of the feed screw shaft 3. This makes it possible to move the female thread portion 21 of the nut member 2 back onto the male thread portion 31 from the non-threaded portion 32 securely and smoothly.

In addition, in a state where the female thread portion 21 is positioned on the male thread portion 31, if the feed screw shaft 3 rotates in a predetermined rotational direction to move the nut member 2 toward the rear of the lens barrel 100, the rear end surface of the nut member 2 presses the pressing surface 552 rearward to thereby move the third lens frame 5B toward the rear of the lens barrel 100 together with the nut member 2.

Accordingly, the first helical compression spring 6 can be omitted in the second embodiment of the lens drive system 1B. This simplifies the structure of the lens drive system 1B, and reduces the cost of production.

The lens drive system according to the present invention can be incorporated in not only cameras but also any other optical devices.

Obvious changes may be made in the specific embodiment of the present invention described herein, such modifications being within the spirit and scope of the invention claimed. It is indicated that all matter contained herein is illustrative and does not limit the scope of the present invention.

As can be understood from the above description, according to a lens drive system to which the present invention is applied, the problem causing the nut member and the feed screw shaft to tightly fasten or lock themselves on each other is reliably prevented from occurring since a non-threaded portion is formed on the feed screw shaft so that the female thread portion of the nut member can move onto the non-threaded portion. Therefore, the feed screw shaft cannot become incapable of rotating relative to the nut member even if the third lens frame retreats beyond the home position.

Moreover, the female thread portion of the nut member can smoothly move back onto the male thread portion of the feed screw shaft from the non-threaded portion thereof after the female thread portion moves onto the non-threaded portion since the lens drive system is provided with a biasing member which directly or indirectly biases the nut member.

What is claimed is:

1. A lens drive system comprising:
   a lens frame having at least one lens element;
   a nut member which is secured to said lens frame, said lens frame and said nut member being movable in an optical axis direction without rotating relative to a base of said lens drive system, the direction of a screw hole of said nut member being parallel with the optical axis;

a feed screw shaft having a male thread portion and a non-threaded portion, said male thread portion being engaged with a screw hole of said nut member so that said male thread portion is engaged with a female thread portion formed on an inner peripheral surface of said screw hole, a diameter of said non-threaded portion being smaller than an inner diameter of said screw hole;

a motor for rotating said feed screw shaft;

a biasing member for biasing said nut member in a first direction from said non-threaded portion toward said male thread portion; and a pressing member having a through hole in which said feed screw shaft is inserted, said pressing member being biased by said biasing member to press said nut member in said first direction from said non-threaded portion to said male thread portion;

wherein, when said feed screw shaft is rotated in a predetermined rotational direction by said motor to move said nut member and said lens frame in a second direction from said male thread portion toward said non-threaded portion, said female thread portion is disengaged from said male thread portion to move onto said non-threaded portion before at least one of said lens frame and said nut member abuts against an element of said lens drive system other than said lens frame and said nut member and stops thereby.

2. The lens drive system according to claim 1, wherein said female thread portion reengages with said male thread portion from said non-threaded portion by a rotation of said feed screw shaft in a rotational direction reverse to said predetermined rotational direction when said female thread portion is positioned on said non-threaded portion.

3. The lens drive system according to claim 1, wherein said biasing member comprises a helical compression spring which is provided coaxially to said feed screw shaft.

4. The lens drive system according to claim 1, wherein a surface of said pressing member which presses said nut member extends in a direction substantially orthogonal to an axis of said feed screw shaft.

5. The lens drive system according to claim 1, wherein a portion of said feed screw shaft is fitted into said through hole of said pressing member with a minimum clearance between said through hole and said portion of said feed screw shaft when said female thread portion is positioned on said non-threaded portion.

6. The lens drive system according to claim 1, further comprising a second biasing member for biasing said lens frame in said first direction from said non-threaded portion toward said male thread portion;

wherein said nut member presses said lens frame to move said lens frame toward said non-threaded portion when said lens frame is driven to move in said second direction from said male thread portion toward said non-threaded portion; and wherein said lens frame moves toward said male thread portion by a biasing force of said second biasing member when said lens frame is driven to move in said first direction from said non-threaded portion toward said male thread portion.

7. The lens drive system according to claim 1, wherein said biasing member biases said nut member in a first direction from said non-threaded portion toward said male thread portion when said female thread portion of said nut member is positioned on said non-threaded portion.

8. The lens drive system according to claim 1, wherein said biasing member indirectly biases said nut member in said first direction from said non-threaded portion toward said male thread portion when said female thread portion of said nut member is positioned on said non-threaded portion.

9. The lens drive system according to claim 3, wherein said helical compression spring is fitted on said feed screw shaft.

10. The lens drive system according to claim 1, wherein said lens drive system is incorporated in a camera having a stop-position controller for optically detecting an axial position of said lens frame, for driving said motor in accordance with said detected axial position of said lens frame, and for stopping said lens frame at a predetermined axial position; and wherein, if said stop-position controller malfunctions, said lens drive system operates to avoid an adverse effect on said lens drive system due to said malfunction.

11. The lens drive system according to claim 10, wherein, if said stop-position controller malfunctions, said lens drive system operates so that said nut member and said feed screw shaft do not tightly fasten themselves on each other when said stop-position controller malfunctions.

12. The lens drive system according to claim 1, wherein said at least one lens element, which is held by said lens frame, comprises a focusing lens group of a photographing optical system.

13. The lens drive system according to claim 1, wherein said lens drive system is incorporated in a zoom lens barrel;

wherein said at least one lens element, which is held by said lens frame, comprises a rearmost lens group serving as a focusing lens group of a photographing optical system; and wherein said base is formed as a part of a housing of said zoom lens barrel.

14. The lens drive system according to claim 1, wherein said lens frame is guided linearly in an optical axis direction without rotating about said optical axis.

15. A lens drive system comprising:

a lens frame having at least one lens element and a pressing portion, said pressing portion having a through hole;

a nut member which is secured to said lens frame, said lens frame and said nut member being movable in an optical axis direction without rotating relative to a base of said lens drive system, the direction of a screw hole of said nut member being parallel with the optical axis;

a feed screw shaft having a male thread portion and a non-threaded portion, said male thread portion being engaged with a screw hole of said nut member so that said male thread portion is engaged with a female thread portion formed on an inner peripheral surface of said screw hole, a diameter of said non-threaded portion being smaller than an inner diameter of said screw hole, and said feed screw shaft being inserted in said through hole of said pressing portion;

a motor for rotating said feed screw shaft; and a biasing member for biasing said lens frame in a first direction from said non-threaded portion toward said male thread portion;

wherein, when said feed screw shaft is rotated in a predetermined rotational direction by said motor to move said lens frame in a second direction from said male thread portion toward said non-threaded portion, said female thread portion is disengaged from said male thread portion to move onto said non-threaded portion before at least one of said lens frame and said nut member abuts against an element of said lens drive system other than said lens frame and said nut member and stops thereby; and wherein at least said pressing portion of said lens frame presses said nut member in said first direction from said non-thread portion to said male thread portion via a biasing force of said biasing member.

16. The lens drive system according to claim 15, wherein said biasing member biases said nut member in said first direction from said non-threaded portion toward said male thread portion; and wherein said female thread portion returns onto said male thread portion from said non-threaded portion by a rotation of said feed screw shaft in a rotational direction reverse to said predetermined rotational direction when said female thread portion is positioned on said non-threaded portion.

17. The lens drive system according to claim 15, wherein said nut member presses said lens frame to move said lens frame toward said non-threaded portion when said lens frame is driven to move in said second direction from said male thread portion toward said non-threaded portion; and wherein said lens frame moves toward said male thread portion by a biasing force of said biasing member when said lens frame is driven to move in said first direction from said non-threaded portion toward said male thread portion.

18. The lens drive system according to claim 15, wherein a surface of said pressing portion which presses said nut member extends in a direction substantially orthogonal to an axis of said feed screw shaft.

19. The lens drive system according to claim 15, wherein said lens drive system is incorporated in a camera having a stop-position controller for optically detecting an axial position of said lens frame, for driving said motor in accordance with said detected axial position of said lens frame, and for stopping said lens frame at a predetermined axial position; and wherein, if said stop-position controller malfunctions, said lens drive system operates to avoid an adverse effect on said lens drive system due to said malfunction.

20. The lens drive system according to claim 19, wherein, if said stop-position controller malfunctions, said lens drive system operates so that said nut member and said feed screw shaft do not tightly fasten themselves on each other when said stop-position controller malfunctions.

21. The lens drive system according to claim 15, wherein said at least one lens element, which is held by said lens frame, comprises a focusing lens group of a photographing optical system.

22. The lens drive system according to claim 15, wherein said lens drive system is incorporated in a zoom lens barrel;

wherein said at least one lens element, which is held by said lens frame, comprises a rearmost lens group serving as a focusing lens group of a photographing optical system; and wherein said base is formed as a part of a housing of said zoom lens barrel.

23. The lens drive system according to claim 15, wherein said lens frame is guided linearly in an optical axis direction without rotating about said optical axis.

24. A lens barrel including a photographing optical system having of a plurality of lens groups, said plurality of lens groups including a focusing lens group, said lens barrel comprising:

a linear guide mechanism for linearly guiding said focusing lens group in an optical axis direction without making said focusing lens group rotate relative to a stationary barrel of said lens barrel;

a nut member having a screw hole which is guided linearly in said optical axis direction without rotating relative to said stationary barrel via said linear guiding mechanism;

a feed screw shaft having a male thread portion and a non-threaded portion, said feed screw shaft being inserted in said screw hole so that said male thread portion is engaged with a female thread portion formed on an inner peripheral surface of said screw hole, a diameter of said non-threaded portion being smaller than an inner diameter of said screw hole;

a motor for rotating said feed screw shaft;

a lens frame which holds at least one lens element and is movable together with said nut member said lens frame comprising a pressing portion having a through hole in which said feed screw shaft is inserted; and a biasing member for biasing said nut member in a first direction from said non-threaded portion toward said male thread portion;

wherein, when said feed screw shaft is rotated in a predetermined rotational direction by said motor to move said nut member and said lens frame in a second direction from said male thread portion toward said non-threaded portion, said female thread portion is disengaged from said male thread portion to move onto said non-threaded portion; and wherein at least said pressing portion of said lens frame presses said nut member in said first direction from said non-threaded portion to said male thread portion via a biasing force of said biasing member.

25. The lens barrel according to claim 24, wherein said linear guide mechanism comprises at least one guide shaft which extends parallel to said optical axis to guide said lens frame linearly in said optical axis direction, said at least one guide shaft being engaged with said nut member to guide said nut member linearly in said optical axis direction.

* * * * *